United States Patent [19]
Akashi et al.

[11] 4,129,050
[45] Dec. 12, 1978

[54] GEAR MEANS OF AN AUTOMATIC TRANSMISSION FOR AUTOMOBILES

[75] Inventors: Teruo Akashi, Okazaki; Kazuaki Watanabe; Yukio Terakura, both of Toyota, all of Japan

[73] Assignee: Toyota Jidosha Kogyo Kabushiki Kaisha, Toyota, Japan

[21] Appl. No.: 823,461

[22] Filed: Aug. 10, 1977

[30] Foreign Application Priority Data
Apr. 28, 1977 [JP] Japan .................................. 52-49445

[51] Int. Cl.² ........................... F16H 3/44; F16H 1/28
[52] U.S. Cl. ..................................... 74/750 R; 29/437; 74/801
[58] Field of Search ................... 74/750 R, 789, 801; 29/437

[56] References Cited
U.S. PATENT DOCUMENTS

| | | |
|---|---|---|
| 3,527,121 | 9/1970 | Moore ............................ 74/801 X |
| 3,667,324 | 6/1972 | Laing ............................. 74/801 |
| 3,939,736 | 2/1976 | Morin ............................ 74/801 |
| 4,043,021 | 8/1977 | Mosbacher .................... 29/437 |

*Primary Examiner*—Leonard H. Gerin
*Attorney, Agent, or Firm*—Stevens, Davis, Miller & Mosher

[57] ABSTRACT

A gear means of an automatic transmission for automobiles including a planetary gear means and friction engaging means in combination, a carrier of the planetary gear means being integrally combined with one of two relatively rotatable elements of the friction engaging means to provide an integral carrier assembly which in turn provides a planetary assembly by incorporating planetary pinions, wherein a rotary mass unbalance of the planetary assembly due to an asymmetrical arrangement of planetary pinions is compensated for by removing a part of the one of the two relatively rotatable elements forming a part of the carrier assembly.

6 Claims, 5 Drawing Figures

GEAR MEANS OF AN AUTOMATIC TRANSMISSION FOR AUTOMOBILES

BACKGROUND OF THE INVENTION

The present invention relates to an automatic transmission for automobiles and, more particularly, to an improvement with regard to a gear means incorporated in the automatic transmission.

An automatic transmission for automobiles generally includes a combination of a fluid torque converter and an auxiliary gear means which provides the direct connection stage as the top gear stage. It is also practiced to incorporate an overdrive means having a reduction gear ratio smaller than unity in an automatic transmission in addition to the aforementioned combination. Conventionally, when an overdrive means is incorporated in an automatic transmission, it has generally been attached to the output side of an auxiliary gear means because such an arrangement requires only a small and easy modification with regard to the entire design of an automatic transmission. However, when an overdrive means is provided at the output side of an auxiliary gear means, the overdrive means must deal with power the torque of which is increased by the auxiliary gear means thereby causing drawbacks such as that heavier gear elements and friction engaging elements are required for the overdrive means which becomes therefore a relatively big and expensive device and yet is still insufficiently durable. Furthermore, the simplicity and ease in modification with regard to the entire design of an automatic transmission available by incorporating an overdrive means at the rear side of an auxiliary gear means is nullified in some cases due to a large modification required for the design of the vehicle body for incorporating such an automatic transmission. In view of these problems, it has been proposed to incorporate an overdrive means between a fluid torque converter and an auxiliary gear means.

As an auxiliary gear means which provides the direct connection stage as the top gear stage, various types of reduction gear mechanisms have been proposed and practiced. These reduction gear mechanisms generally include a planetary gear mechanism wherein the carrier of the planetary gear mechanism is adapted to be selectively connected to another rotary or stationary element by friction engaging means such as a clutch or brake so as to establish various speed stages. Even in an automatic transmission of the aforementioned type including an overdrive means incorporated between a fluid torque converter and an auxiliary gear means, the overdrive means is constructed as a planetary gear mechanism.

A planetary gear means generally comprises a sun gear, a ring gear, a plurality of planetary pinions and a carrier, wherein the planetary pinions are positioned in an annular space defined between the sun gear and the ring gear while meshing with these gears and are supported by the carrier so as to rotate around their own axes as well as to revolve around the sun gear. A plurality of planetary pinions are arranged approximately uniformly or symmetrically in the annular space defined between the sun gear and the ring gear in order to obtain mass balance of the combination of the carrier and the planetary pinions around the central axis of rotation of the assembly. In this connection, if a plurality of planetary pinions are to be arranged perfectly uniformly in the annular space, the following condition must be satisfied:

$$K = (Z_s + Z_r)/N$$

wherein K is an integer; N is the number of planetary pinions; $Z_s$ is the number of teeth of the sun gear; and $Z_r$ is the number of teeth of the ring gear.

On the other hand, in accordance with the manner of use, the gear ratio (reduction gear ratio) of a planetary gear means is determined by the following formulae:

$$Z_r/(Z_s + Z_r), Z_s/(Z_s + Z_r), Z_s/Z_r$$

Therefore, when a planetary gear means having a certain required gear ratio is to be designed within the practical range of number of teeth, the aforementioned equation for the uniform arrangement of the planetary pinions is not necessarily satisfied. In fact, in most cases the planetary pinions are not uniformly arranged in the annular space defined between the sun gear and the ring gear.

Conventionally, an unbalance of the mass of the rotary assembly of a carrier and a plurality of planetary pinions caused by such a non-uniform arrangement of the planetary pinions has been compensated by forming a bore or bores in a bridge portion of the carrier so as to remove a part of the mass thereof. However, when a substantial opening or openings are formed in the bridge portion of the carrier, the rigidity of the carrier, particularly that of a part including the bridge portion formed with the openings, is reduced, thereby causing serious damage to the pinion pins, needle bearings, thrust washers or the like which support the planetary pinions, and shortening the lifetime of the automatic transmission. In a conventional automatic transmission which provides the direct connection stage as the top gear stage, the problem of the pinion pins, needle bearings, thrust washers, or the like being damaged often is not very serious because the planetary gear means is locked, so that the planetary pinions do not rotate around the pinion pins, in the direct connection stage which occupies the substantial part of the operating hours of the automatic transmission. However, in an automatic transmission having an overdrive means such as the one of the aforementioned type including a planetary gear means which is interposed between a fluid torque converter and an auxiliary gear means, the planetary gear means makes a planetary movement in the overdrive stage which occupies a relatively large proportion of the operating hours of the automatic transmission, and, because of this, damage caused to the pinion pins, needle bearings, thrust washers or the like due to the reduction of rigidity of the carrier presents a very serious problem.

SUMMARY OF THE INVENTION

It is therefore the object of the present invention to deal with the aforementioned problems and to provide an improved gear means for an automatic transmission which is improved from the viewpoint of the rotary mass balance in the planetary gear means.

In order to accomplish this object, the present invention notes that a planetary gear means in an automatic transmission for automobiles has a carrier combined with one of two relatively rotatable elements of friction engaging means such as a clutch or brake which selectively connects the carrier to another rotary or stationary element, or, in more detail, that the carrier and one element of the friction engaging means are integrally combined to provide a carrier assembly. In consideration of this particular feature, the present invention contemplates to provide a planetary assembly composed of the aforementioned carrier assembly and a plurality of planetary pinions which has a well-adjusted rotary mass balance around the central axis thereof by a part of the element of the friction engaging means which provides the aforementioned carrier assembly in combination with the carrier being removed.

BRIEF DESCRIPTION OF THE DRAWING

The present invention will become more fully understood from the detailed description given hereinbelow and the accompanying drawings which are given by way of illustration only and are thus not limitative of the present invention and wherein.

DESCRIPTION OF THE PREFERRED EMBODIMENT

Figure 1:
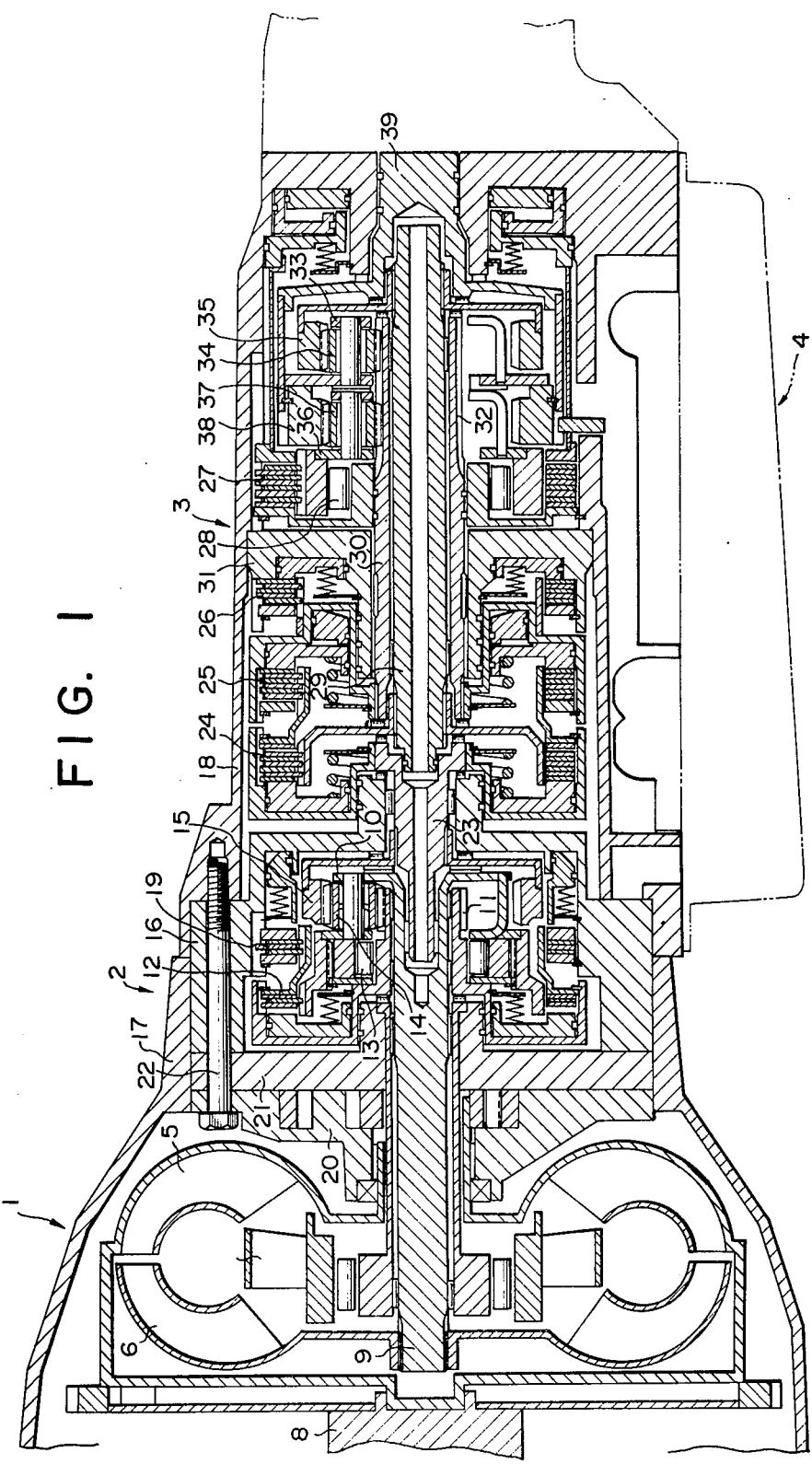
FIG. 1 is a sectional view showing an example of an automatic transmission having an overdrive means in which the present invention is incorporated.

Referring to FIG. 1 which shows an automatic transmission in which the present invention is incorporated the automatic transmission comprises a fluid torque converter 1, an overdrive means 2, an auxiliary reduction gear means 3 for effecting three forward speed stages and one rearward speed stage and an oil pressure control means 4. The fluid torque converter 1 is of a conventional well-known type including a pump impeller 5, a turbine 6 and a stator 7. The pump impeller 5 is connected with a crank shaft 8 of an engine (not shown) while the turbine 6 is connected with a turbine shaft 9 which forms an output shaft of the fluid torque converter. This output shaft also provides an input shaft of the overdrive means 2, wherein the input shaft is connected with a carrier 10 of a planetary gear mechanism incorporated in the overdrive means. The carrier 10 rotatably supports a plurality of planetary pinions 14 which in turn are engaged with a sun gear 11 and a ring gear 15. A multi-disc clutch 12 and a one-way clutch 13 are provided between the sun gear 11 and the carrier 10 and, furthermore, a multi-disc brake 19 is provided between the sun gear 11 and an overdrive housing or case 16 enclosing the overdrive means or the planetary gear mechanism. The fluid torque converter 1 has a housing 17 which encloses therein the pump impeller 5, the turbine 6 and the stator 7. The auxiliary gear means 3 has a housing or transmission case 18 which encloses therein planetary gear mechanisms, clutches and brakes such as mentioned below. These housings 17 and 18 are joined together by connecting bolts means not shown in the figure. An oil pump is incorporated in a pump body formed by housing means 20 and 21. The overdrive case 16 and the oil pump housing 20, 21 are fastened to the transmission case 18 by bolts 22, one of which is shown in the figure.

In assembling the transmission, the overdrive case 16 and the oil pump body means 20, 21 are first fastened to the transmission case 18 by the bolts 22 and then the torque converter housing 17 is assembled thereon and joined with the transmission case 18 by the aforementioned bolt means (not shown).

In this case, when the cylindrical outer peripheral surface $S_{16}$ of the overdrive case, the cylindrical inner peripheral surface $S_{17}$ of the rear end portion of the torque converter housing, the cylindrical inner peripheral surface $S_{18}$ of the front end portion of the transmission case and the cylindrical outer peripheral surfaces $S_{20}$ and $S_{21}$ of the oil pump body are formed to be concenrically engaged with one another, the torque converter, the overdrive means and the reduction gear means are automatically aligned to the central axis of the transmission by the engagement of said cylindrical surfaces.

The ring gear 15 of the overdrive means 2 is connected with an input shaft 23 of the auxiliary gear means 3. A multi-disc clutch 24 is provided between the input shaft 23 and an intermediate shaft 29 while a multi-disc clutch 25 is provided between the input shaft 23 and a sun gear shaft 30. A multi-disc brake 26 is provided between the sun gear shaft 30 and a support 31 fixed to the transmission case 18. The sun gear shaft 30 has a sun gear 32 integrally formed therein, said sun gear meshing with a plurality of first planetary pinions 34 (only one is shown) which mesh in turn with a ring gear 35 supported by a carrier 33 thereby forming a first set of planetary gear mechanism, while the sun gear 32 also meshes with a plurality of second planetary pinions 37 (one is shown) which mesh in turn with a ring gear 38 supported by a carrier 36, thereby forming a second set of planetary gear mechanism. The ring gear 35 of said first planetary gear mechanism is connected with the intermediate shaft 29, while the carrier 33 thereof is connected with the ring gear 38 of said second planetary gear mechanism. The combination of the carrier 33 and the ring gear 38 is connected with an output shaft 39. A multi-disc brake 27 and a one-way clutch 28 are provided between the carrier 36 of said second planetary gear mechanism and the transmission case 18.

The oil pressure control means 4 positioned below the auxiliary gear means 3 includes various change-over valve means (not shown) and is adapted to control the supply of oil pressure to the aforementioned clutches and brakes in order to accomplish various shift conditions among four forward speed stages including an overdrive stage and one rearward drive stage in accordance with the operation of a manual shift valve (not shown) and/or the balance between the engine output shaft and the vehicle speed.

Table 1 shows the operating conditions of the clutches and brakes in various shift conditions.

TABLE 1

| SHIFT POSITION | | | FRICTION ENGAGING MEANS | CLUTCH 12 | CLUTCH 24 | CLUTCH 25 | BRAKE 19 | BRAKE 26 | BRAKE 27 | ONE-WAY CLUTCH 13 | ONE-WAY CLUTCH 28 |
|---|---|---|---|---|---|---|---|---|---|---|---|
| | | | PARKING | O | X | X | X | X | O | — | — |
| | | | REVERSE | O | X | O | X | X | O | Lock | Lock |
| | | | NEUTRAL | O | X | X | X | X | X | — | — |
| FOR- | D | | 1st Speed | O | O | X | X | X | X | Lock | Lock |
| WARD | RANGE | | 2nd Speed | O | O | X | X | O | X | Lock | Overrun |
| | | | 3rd Speed | O | O | O | X | X | X | Lock | Overrun |
| | | | O.D. | X | O | O | O | X | X | Overrun | Overrun |
| | 2 | | 1st Speed | O | O | X | X | X | X | Lock | Lock |
| | RANGE | | 2nd Speed | O | O | X | X | O | X | Lock | Overrun |
| | L RANGE | | | O | O | X | X | X | O | Lock | Lock |

Wherein O shows that the clutch or brake is engaged; and X shows that the clutch or brake is disengaged.

Figure 2:
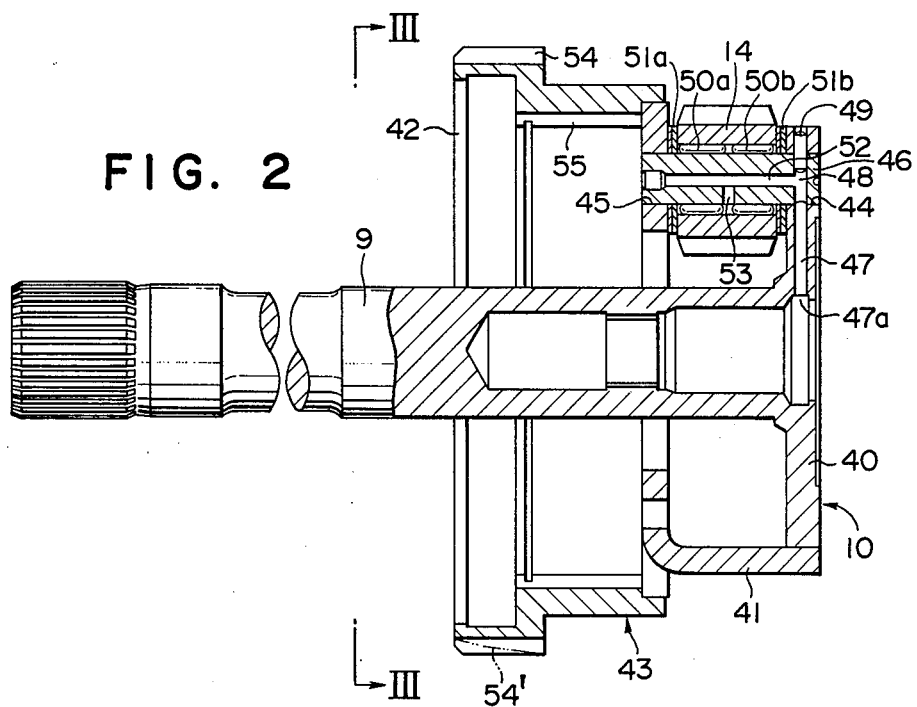
FIG. 2 is a sectional view of a planetary assembly included in the overdrive means of the automatic transmission shown in FIG. 1 and is a sectional view along line II—II in FIG. 3.
Figure 3:
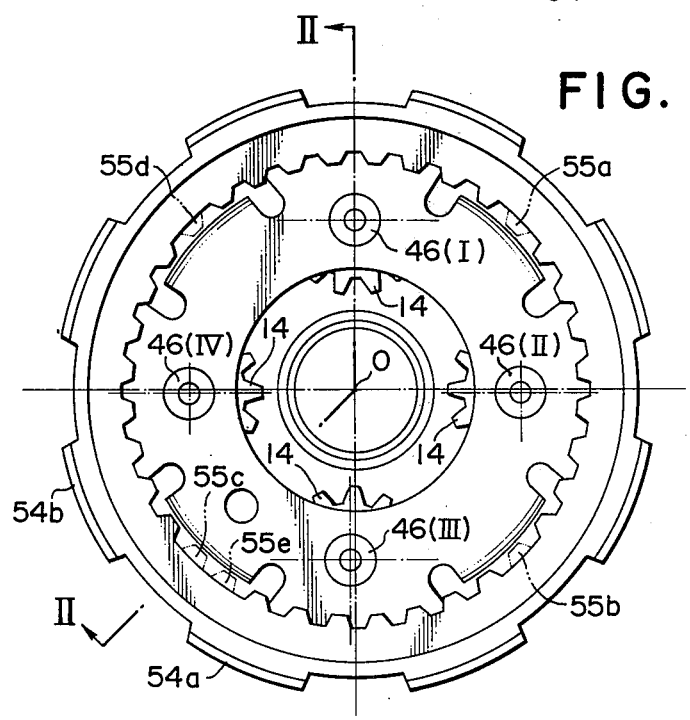
FIG. 3 is an end view of the planetary assembly shown in FIG. 2 as seen in the direction of arrows III—III in FIG. 2.

Referring to FIGS. 2 and 3, the carrier 10 is constructed by a flange portion 40 formed at the rear end portion of the turbine shaft 9 as an integral part thereof and a cage element 41 connected with the flange portion by welding, wherein the turbine shaft 9 serves as an output shaft of the torque converter 1 as well as an input shaft of the overdrive means 2. The cage element 41 is integrally combined with an annular clutch hub 42 by welding, said clutch hub forming one of the two relatively rotatable elements of the friction engaging means, whereby a carrier assembly generally designated by 43 is constructed. The flange portion 40 and the cage element 41 are formed with axially aligned openings 44 and 45 at four positions arranged with approximately uniform spacing around the central axis thereof. Pinion pins 46 are received in these openings. In the flange portion 40, radial oil passages 47 (only one is shown in FIG. 2) are bored to traverse the centers of the openings 44, while each pinion pin 46 has a diametrical hole 48 bored to align with the oil passage 47. The pinion pin 46 is fixed at its predetermined mounting position by a plug 49 pressed into the aligned holes 47 and 48 from the outer end of the oil passage 47. Of course prior to the fixing of the pinion pin the planetary pinion 14 is mounted to the pinion pin by means of a radial bearing such as two rows of needle bearings 50a and 50b as in the shown embodiment and thrust bearing means such as washers 51a and 51b. The pinion pin 46 has a central axial hole 52 communicating with the diametrical hole 48 and radial holes 53 located at an intermediate portion thereof and communicating with the center hole 52. By the oil passage system composed of these holes, lubricating oil pumped into the oil passage 47 from its radially inner end 47a is supplied to the needle bearings 50a, 50b, and thrust washers 51a, 51b for lubrication of these bearing means.

Clutch hub 42 includes splines 54 in its forward outer peripheral portion for receiving clutch discs of the multi-disc clutch 12 as well as splines 55 in its rearward inner peripheral portion for receiving the one-way clutch 13.

As shown in FIG. 3, the four planetary pinions 14 or the pinion pins 46 (I, II, III, IV) supporting the planetary pinions are not symmetrically arranged around the central axis 0 so as to make the strict spacing angle of 90°, but they are somewhat displaced from the symmetrical arrangement. This is unavoidable in actual design of a planetary gear means as explained above. Because of this asymmetrical arrangement of the planetary pinions, the planetary assembly composed of the carrier assembly 43 and the four planetary pinions 14, i.e., the rotary structure as shown in FIGS. 2 and 3, has a certain mass unbalance with respect to the central axis of rotation thereof.

In order to compensate for this mass unbalance, in the embodiment shown in FIGS. 2 and 3, a part of the splines 55 is removed. In the shown embodiment, four symmetrically located splines 55a, 55b, 55c and 55d and another spline 55e located adjacent to the spline 55c are removed. By judiciously removing a part of the splines 55, for example as in FIG. 3, the mass unbalance with respect to the central axis of rotation of the planetary assembly due to an asymmetrical arrangement of the planetary pinions 14 can be perfectly compensated. The removal of a part of the splines 55 formed in the clutch hub 42 has no harmful effect on the rigidity of the carrier 10 or the carrier assembly 43. Thus, the rotary mass balancing of the planetary assembly is accomplished without sacrificing the rigidity of the carrier.

Alternatively, in the embodiment shown in FIGS. 2 and 3, the rotary mass unbalance of the planetary assembly due to an asymmetrical arrangement of the planetary pinions 14 may be compensated for by removing a part of the splines 54 without causing any harmful effect on the rigidity of the carrier. In this case, for example, an end portion of a certain spline 54a and 54b may be removed in a manner such as shown by 54' in FIG. 2.

Figure 4:
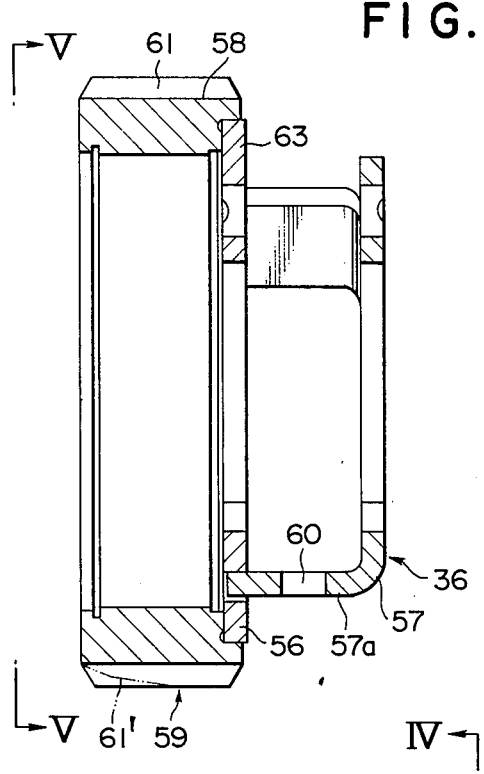
FIG. 4 is a sectional view of a carrier assembly of a planetary gear means included in an auxiliary gear means of the automatic transmission shown in FIG. 1 and is a sectional view along line IV—IV in FIG. 5.
Figure 5:
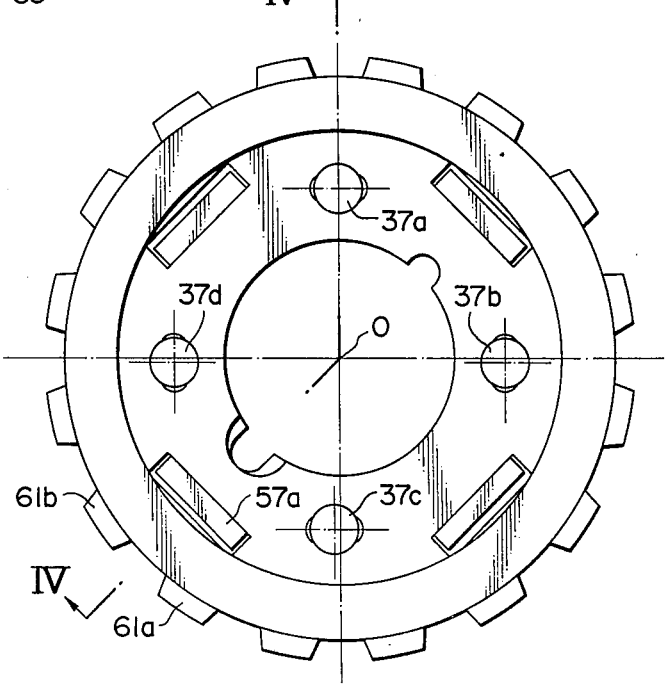
FIG. 5 is an end view of the carrier assembly shown in FIG. 4 as seen in the direction of arrows V—V.

Referring next to FIGS. 4 and 5, the carrier 36 is shown as being composed of an annular disc element 56 and a cage element 57 connected by welding. The annular disc element 56 is further connected with an annular brake hub 58 by welding thereby providing a carrier assembly generally designated by 59. In this carrier assembly four openings 37a, 37b, 37c and 37d for receiving planetary pinions 37 are not symmetrically arranged around the central axis 0 of the planetary gear means so as to provide the uniform spacing of 90° but they are somewhat displaced from the symmetrical arrangement. Because of this, a planetary assembly composed of the carrier assembly 59 and four planetary pinions 37 has a certain mass unbalance with respect to the central axis of rotation. Conventionally, such rotary mass unbalance has been compensated for by boring a hole 60 in the bridge portion 57a of the cage element 57. However, the boring of the hole in the bridge portion causes a substantial reduction of rigidity of the carrier 36 thereby causing an early damaging of the pinion pins, needle bearings, thrust washers or the like which support the planetary pinions.

In accordance with the present invention, a rotary mass unbalance with respect to the central axis of rotation of the planetary assembly due to an asymmetrical arrangement of the planetary pinions is compensated for by judiciously removing a part of the brake hub 58, particularly a part of the splines 61 formed in the outer peripheral portion thereof.

In this case, for example, axial end portions of the splines 61a and 61b may be removed as shown by 61' in FIG. 4.

From the foregoing, it will be appreciated that the present invention provides a planetary assembly wherein a rotary mass unbalance due to an asymmetrical arrangement of planetary pinions is perfectly compensated for without causing any harmful effect on the rigidity of the carrier.

Although the invention has been shown and described with respect to some preferred embodiment thereof, it should be understood by those skilled in the art that various changes and omissions of the form and detail thereof may be made therein without departing from the scope of the invention.

We claim:

1. A gear means of an automatic transmission for automobiles, comprising a housing, a planetary gear means including a sun gear, a ring gear, planetary pinions and a carrier, and friction engaging means having two relatively rotatable elements and adapted to selectively connect said carrier to another element which is either said sun gear or said housing, said carrier and one of said two relatively rotatable elements being integrally connected with each other to form a carrier assembly which in turn provides a planetary assembly by incorporating said planetary pinions therein, wherein the mass balance of said planetary assembly around the central axis thereof is adjusted by removing a part of said one of said two relatively rotatable elements.

2. The gear means of claim 1, wherein said one of said two relatively rotatable elements is an annular hub member having splines, a part of said splines being removed so as to be asymmetrical with respect to the central axis of said planetary assembly.

3. The gear means of claim 2, wherein a certain one of said splines is completely removed.

4. The gear means of claim 2, wherein an axial end portion of a certain one of said splines is partially removed.

5. The gear means of claim 3, wherein said splines are internal splines formed in said annular hub member.

6. The gear means of claim 4, wherein said splines are external splines formed in said annular hub member.

* * * * *